US012710593B2

(12) United States Patent
Koshelev et al.

(10) Patent No.: US 12,710,593 B2
(45) Date of Patent: Aug. 18, 2026

(54) TIR-ASSISTED LASER WELDING OF OPTICAL COMPONENTS

(71) Applicant: GOOGLE LLC, Mountain View, CA (US)

(72) Inventors: Alexander Koshelev, San Jose, CA (US); Christophe Peroz, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 344 days.

(21) Appl. No.: 18/530,335

(22) Filed: Dec. 6, 2023

(65) Prior Publication Data

US 2025/0189724 A1 Jun. 12, 2025

(51) Int. Cl.
*G02B 6/26* (2006.01)
*B29D 11/00* (2006.01)
*B29K 105/04* (2006.01)

(52) U.S. Cl.
CPC ........ *G02B 6/262* (2013.01); *B29D 11/00721* (2013.01); *B29K 2105/041* (2013.01); *B29K 2995/0006* (2013.01); *B29K 2995/0026* (2013.01); *B29K 2995/003* (2013.01)

(58) Field of Classification Search
CPC ...... B29K 2995/0006; B29K 2105/041; G02B 6/262
See application file for complete search history.

(56) References Cited

U.S. PATENT DOCUMENTS

2005/0094939 A1 5/2005 Ghiron et al.
2005/0121424 A1 6/2005 Caldwell et al.
2007/0122314 A1* 5/2007 Strand ................ B29C 65/1635 422/400
2012/0002203 A1 1/2012 Romanato et al.
2014/0308476 A1 10/2014 Manninen
2020/0192107 A1 6/2020 Boriskin et al.
2021/0356406 A1 11/2021 Romanovsky et al.

FOREIGN PATENT DOCUMENTS

WO WO-2015060822 A1 * 4/2015 ............... G02B 6/13

* cited by examiner

*Primary Examiner* — Uyen Chau N Le
*Assistant Examiner* — Hoang Q Tran

(57) ABSTRACT

In some implementations, the method may include disposing an infrared (IR) absorbing material at one or both of a first surface of a first transparent body composed of a polymer or a second surface of a second transparent body composed of the polymer. In addition, the method may include positioning the first transparent body adjacent to the second transparent body so that the first surface abuts the second surface. The method may include bonding the first transparent body to the second transparent body through reflow of the polymer at an interface between the first surface and the second surface by emitting light, via a first light source, into the first transparent body and which is converted to heat energy by the IR absorbing material.

17 Claims, 7 Drawing Sheets

TIR-ASSISTED LASER WELDING OF OPTICAL COMPONENTS

BACKGROUND

The fabrication process for optical components often involves the bonding of two or more optical elements together. A widely adopted bonding method is cementing, wherein an index matching adhesive is applied between the optical components, which are then brought into contact and then the adhesive is allowed to cure. This establishes both a mechanical and an optical connection, enabling visible light to pass through with minimal reflections. However, a challenge lies in finding a suitable index matching adhesive, particularly for materials with high refractive indices. Additionally, selecting an adhesive that aligns with thermo-mechanical properties, especially coefficients of thermal expansion (CTE) and Young's modulus, with that of the polymer defining the optical element may be difficult. The possibility of air bubbles being trapped within the adhesive during bonding is another potential concern.

One application where bonding presents a challenge is in the fabrication process for creating polymer reflective waveguides for Augmented Reality (AR). Currently, many waveguides include an array of semi-transparent louver mirrors, typically composed of multi-layer dielectric films, housed within a waveguide. The fabrication process for such waveguides often involves techniques such as injection molding or other replication methods. Initially, a body containing a prism array is created through injection molding of a polymer material. This body is then coated to form semi-transparent louver mirrors. In a subsequent step, a conforming counterpart body is fashioned from the same polymer material, employing techniques like injection molding or similar molding methods. Finally, the two bodies are mechanically and optically joined using an index-matching adhesive to form the waveguide. However, using adhesive to bond the two polymer bodies presents certain challenges. Firstly, due to the intricate shape of the prism arrays, there is an increased likelihood of air bubbles being trapped within the adhesive. Moreover, since the display light travels along the waveguide for several millimeters and interacts with the adhesive layer multiple times (typically between 5 and 100 times), the introduction of phase delay and light scattering by the adhesive layer leads to considerable degradation in image quality.

Another frequently employed method for attaching polymer parts is laser welding, which omits the need for adhesive. This approach involves melting or softening a significant portion of polymer on either side of the seam between two parts, which could result in part deformation. Consequently, conventional laser welding techniques typically are unsuitable for bonding optical components, as the optical performance, including the waveguide's performance, relies on maintaining precise surface figure.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-9 illustrate example methods and systems for TIR-assisted laser welding of optical components. In implementations, an optical component implementing a waveguide is fabricated by disposing a light-absorbing material at one or both of a first surface of a first transparent body composed of a polymer material or a second surface of a second transparent body composed of the polymer material. In implementations, the light-absorbing material is configured to absorb light at a particular wavelength range (e.g., an infrared (IR) wavelength range) and convert the absorbed light into heat energy. The first and second transparent bodies are disposed so that the first surface and second surface are abutting. Welding light having a wavelength or wavelengths within the wavelength range of the light-absorbing material is introduced into the first transparent body at one or more angles that induce the welding light is propagated across most or all of the interface formed between the abutting first and second surface via TIR within the first transparent body. As the welding light impinges on a region of this interface, the light-absorbing material proximate to that region absorbs some of the welding light and converts the absorbed welding light to heat energy, thereby causing polymer material of one or both of the first transparent body or second transparent body in the surrounding region to reflow, and thus mechanically and optically bond the first and second bodies together in that region.

The system includes a laser source, which emits a beam of light. The power from the beam may be delivered to a very thin layer and the polymer that has a relatively low melting point. In an aspect, the laser intensity does not need to be substantially high and therefore the laser does not need to be focused in this specific application. For example, the light may be focused on the input of the prism. This laser source may be a solid-state laser, a diode laser, and/or another type of laser depending on the specific requirements of the application. The laser beam is then focused onto the area where the waveguides are to be bonded. This is typically done using a lens that focuses the beam to a relatively small spot size. The focused beam provides energy for the welding process. The waveguide structure is designed to exploit the phenomenon of TIR to distribute the emitted light across the abutting surfaces of the bodies of the workpiece. In other words, light is contained within the waveguide due to the refractive index difference between the waveguide material and its surroundings. The laser energy absorbed by the waveguide material creates localized heating, causing the material to soften or melt. This allows the separate waveguide components to fuse together, forming a strong and precise bond. After the welding process, the material is allowed to cool and solidify, creating a seamless joint between the waveguide components.

Figure 1:
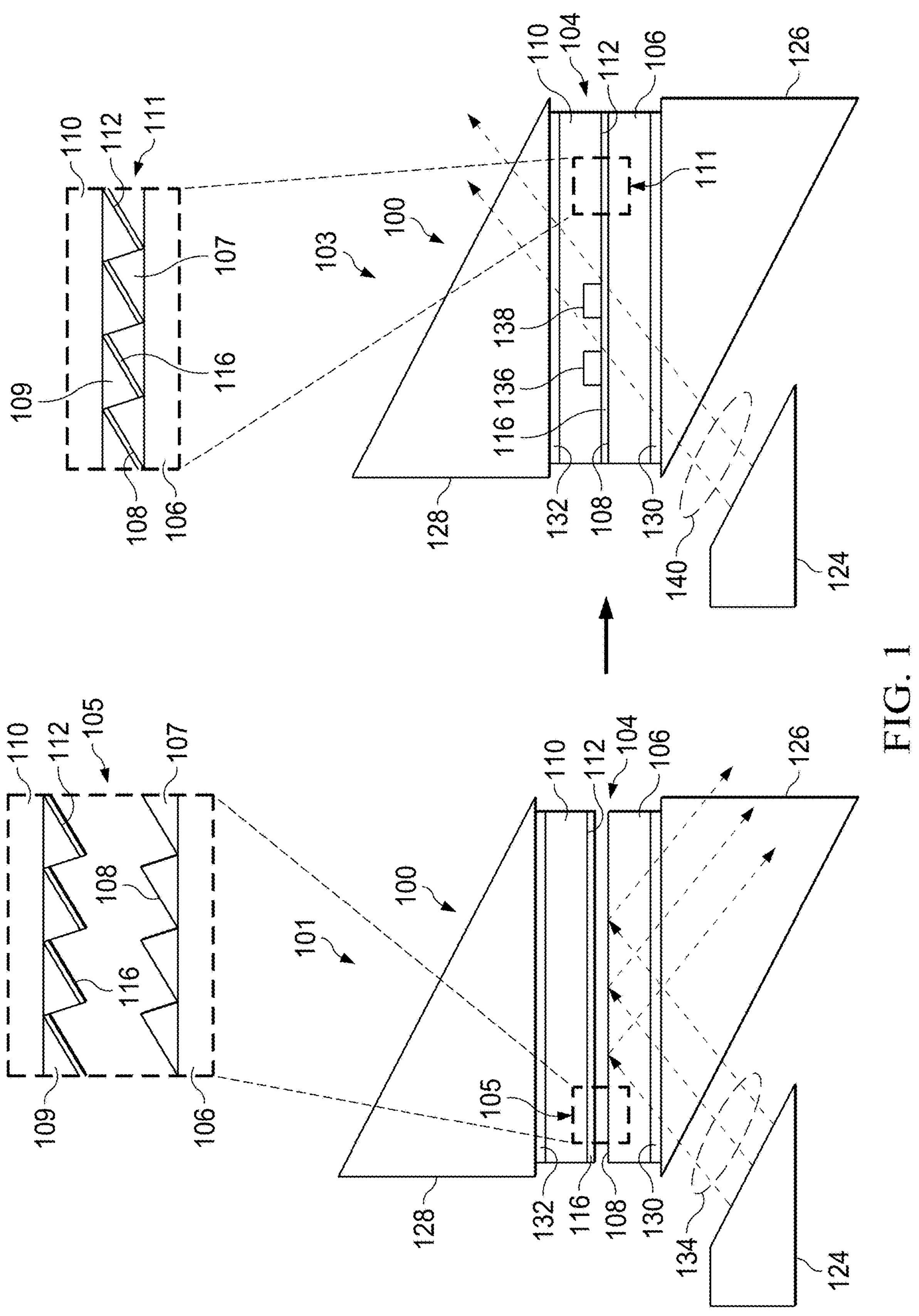
FIG. 1 illustrates a system and process for total internal reflection (TIR)-assisted laser bonding of two transparent bodies of a waveguide workpiece in accordance with some embodiments.

Referring now to FIG. 1, an example of an optical component 100 capable of implementing the process of TIR-assisted laser welding of optical components is illustrated according to implementations. In particular, FIG. 1 illustrates optical component 100 prior to the process of the TIR-assisted laser welding (view 101) and during TIR-assisted laser welding (view 103). The optical component 100 is formed from waveguide workpiece 104 formed from the laser-welded bonding of a transparent body 106 to a transparent body 110. The transparent body 106 and the transparent body 110 both are composed of an optical plastic or other suitable polymer that is at least semi-transparent to visible and infrared (IR) light, and may be the same polymer or different polymers for transparent bodies 106, 110. The transparent body 106 has a surface 108 facing a surface 112 of transparent body 110. As illustrated by expanded view 105, the surface 108 of the transparent body 106 has louver features 107 disposed at portion(s) or the entirety of surface 108, while the surface 112 of the transparent body 110 has complementary (or conforming) louver features 109 disposed at corresponding portion(s) or the entirety of the surface 112 such that, as shown by view 111 and described in greater detail herein, when the surface 108 and the surface 112 are brought into contact and laser welded, the louver features 107 and 109 together (along with one or more intervening optical layers, described below) form a set of at least partially reflective louver mirrors.

An IR absorbing layer 116 is disposed on surface 112 (or in other implementations, on surface 108, or on both surfaces 108 and 112). The IR absorbing layer 116 is composed of one or more materials that operate to absorb the IR light at a particular wavelength or wavelength range. Examples of such materials include dyes, sub-wavelength sized nanoparticles, micro-structured surfaces, and/or other absorbing materials. For example, commercial NIR/MIR and laser absorbing dyes are available in a wide spectral range such as NIR dyes, ultraviolet (UV) dyes, laser welding dyes, visible dyes, metal (Al, Au . . . ), semiconductor (Si, PbS . . . ). Nanoparticles may be associated with an organic or inorganic (or hybrid organic/inorganic) matrix to create customized absorptive films. Additionally, one or more other optical coatings (omitted for ease of illustration) may be applied to one or both of the surfaces 108, 112, such as one or more anti-reflective coatings, a dielectric coating, and the like. In an embodiment, the optical coatings may have a thickness range of about 0.01 μm to about 3 μm thick. In an embodiment, an absorptive coating, such as a second IR light absorbing material (not shown), may be applied to the second surface to absorb the welding laser's light and initiate local bonding. In an embodiment, the absorptive coating may have a thickness range of about 0.01 μm to about 3 μm thick. In an embodiment, the absorptive coating may include, but not be limited to, dyes, sub-wavelength sized nanoparticles, micro-structured surfaces, and/or other absorbing materials.

The TIR-assisted laser welding process described herein utilizes projection of welding laser light into and through waveguide workpiece 104 via a light source 124. Accordingly, a coupling prism 126 may be disposed at the surface of the transparent body 106 opposite the surface 108 to facilitate introduction of the welding laser light into the bulk polymer of the transparent body 106. Likewise, a coupling prism 128 may be disposed at the surface of the transparent body 110 opposite the surface 112 of the transparent body 110 to facilitate extraction of the laser welding light from the bulk polymer of the transparent body 110. Moreover, an immersion substance 130 (e.g., an oil) may be disposed between the coupling prism 126 and the facing surface of the transparent body 106 and an immersion substance 132 may be disposed between the coupling prism 128 and the facing surface of the transparent body 110 to facilitate the insertion and extraction of the welding laser light.

As a general summary, the TIR-assisted laser welding process described herein utilizes two principles. Firstly, welding laser light introduced into first transparent body 106 will totally internally reflect at the surface 108 except in areas where the surface 108 is in contact with the surface 112 of the transparent body 110 (such areas are referred to herein as "optical contact areas"). To illustrate, as shown by view 101, before the transparent bodies 106, 110 are pressed into contact, any welding laser light 134 introduced into transparent body 106 would totally reflect back into transparent body 106 at surface 108. Secondly, optical contact areas where the surface 108 is in contact with the surface 112, the welding laser light introduced into the transparent body 106 will not totally internally reflect, but instead at least a portion of the welding laser light will escape the transparent body 106 at the contact region and impinge upon the IR absorbing layer 116 in the optical contact area, thereby causing the IR absorbing material in the optical contact area to optically or chemically absorb the IR light and convert the energy of the absorbed IR light to heat energy, which in turn causes the polymer of one or both of the transparent bodies 106, 110 in the optical contact area to soften or melt.

In an embodiment, a laser absorbing layer may include, but not be limited to, a slow saturable absorber. This type of material absorbs light for a brief period, depleting the dopants in the ground state, after which it becomes transparent for the remaining duration of the pulse. In the TIR-assisted welding process described earlier, such a material may provide absorption and generate heat to melt a small section of the polymer from the first transparent body 106 beneath the contact point. Once the absorber is depleted and becomes transparent, it no longer converts laser light into heat. Consequently, the entirety of the contact area that has already been welded remains cool and solid for the remainder of the welding process.

As noted, in at least one embodiment the light source 124 emits a welding laser light that interacts with the IR absorbing layer 116 so as to at least partially convert the energy of the welding laser light impinging on an area of the IR absorbing layer 116 to heat energy so as to induce polymer reflow in that area. As such, In an embodiment, the bulk polymer of transparent bodies 106, 110, the material(s) of the IR absorbing layer 116, and the wavelength (Mas) of the laser light emitted by light source 124 are selected so that the transparent bodies 106, 110 are substantially transparent to the welding laser light so as to avoid heating of bulk polymer due to transmission of the welding laser light through the bulk polymer itself. The Near-Infrared (NIR) and Mid-Infrared (MIR) spectra are regions of the electromagnetic spectrum characterized by specific wavelength ranges. In an embodiment, wavelength ranges in the NIR and MIR spectra are optically transparent for the polymer core of the waveguide. This transparency does not interfere with visible light, and these spectra ranges offer a wide selection of absorptive coatings, including but not limited to, commercial NIR/MIR dyes, metal (Al, Au, etc.), and/or semiconductor (Si, PbS, etc.) nanoparticles.

Figure 2:
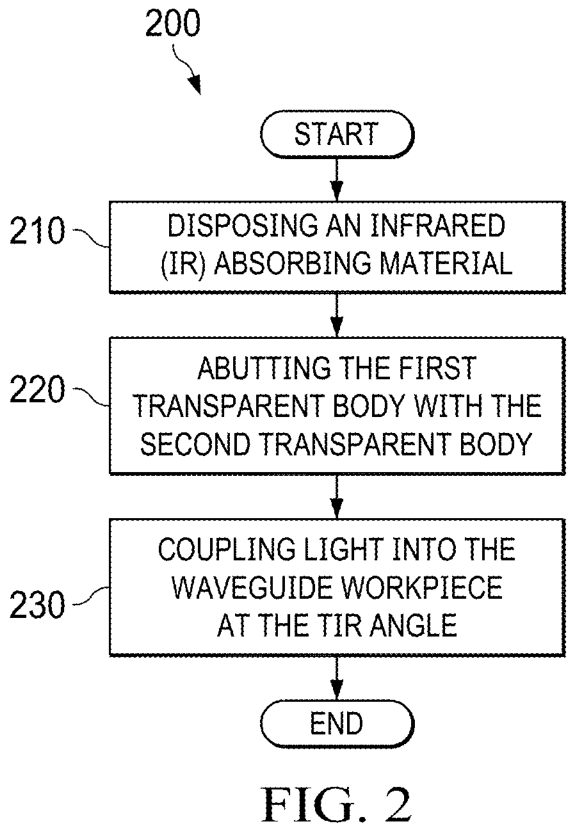
FIG. 2 illustrates a TIR-assisted laser bonding process using the system of FIG. 1 in accordance with some embodiments.

FIG. 2 shows a method 200 of bonding the transparent bodies 106 and 110 of the waveguide workpiece 104 of FIG. 1 together using a TIR-assisted laser welding process in accordance with some embodiments. At block 210, the IR absorbing layer 116 is disposed on one or both of the surface 108 and the surface 112 prior to bonding using any of a variety of coating techniques, such as spin deposition. At block 220, pressure is applied to bring the transparent bodies 106 and 110 further into contact. At block 230, when welding laser light 140 is introduced into transparent body 106, the welding laser light 140 breaks the TIR condition within the transparent body 106 at optical contact areas 136, 138 thereby impinging on IR absorbing layer 116 in these optical contact areas 136, 138. As a result, the polymer in the surrounding regions heats up, which forces the softened/melted polymer material to flow sideways (that is, reflow) and bringing the surfaces 108, 112 further into contact, creating new optical contact areas that then may be subjected to the same laser light escape/heating/reflow process. Further, the softened polymer spreads out sideways, increasing the size of the optical contact area. This process also forces air out of the interface between the surfaces 108, 112 at the optical contact area, thereby mitigating the risk of air bubbles. To illustrate, in view 111, initial contact between surfaces 108, 112 introduces a number of optical contact areas, including optical contact areas 136 and 138. As such, more and more of the surfaces 108, 112 will be brought into optical contact as the welding process progresses, and as the light source 124 continues to distribute the welding laser light across the surface 108 (via, e.g., the coupling prism 126 and a change in angle of the output of the light source 124 relative to the waveguide workpiece 104), process of laser absorption and subsequent reflow of the polymer will occur substantially everywhere over the surfaces 108, 112, which will thus result in the optical and mechanical bonding of the surfaces 108, 112 with reduced risk of warpage or distortion and introduction of air bubbles.

Figure 3:
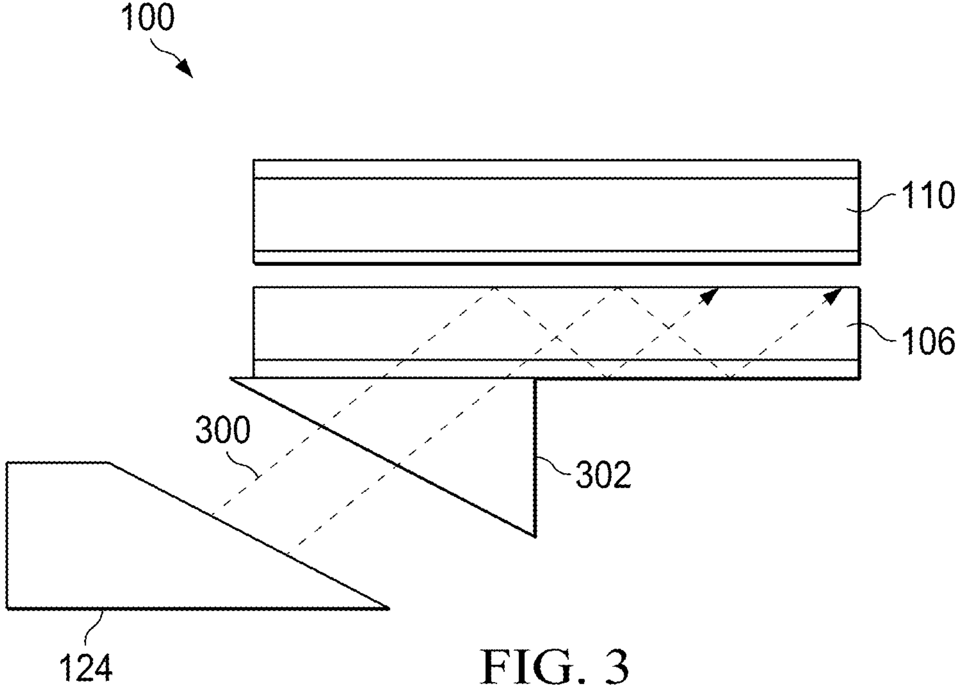
FIG. 3 illustrates another example system and process for TIR-assisted laser bonding using a coupling prism to provide laser input at varying angles in accordance with some embodiments.

FIG. 3 illustrates another example implementation of optical component 100 implementing the process of TIR-assisted laser welding of optical components using a coupling prism to provide laser input at a varying angle. A welding laser light 300 is coupled into transparent body 106, via, e.g., the coupling prism 302, specifically near the edge, rather than being distributed across the entire surface as depicted in FIG. 1. Due to the TIR angle, the welding laser light 300 travels through the transparent body 106 via a waveguiding effect. This enables the recycling of the welding laser light 300, maintaining consistent light intensity. In this method, welding laser light 300 is coupled into the transparent body 106 at an angle that allows it to undergo total internal reflection within the polymer material.

Figure 4:
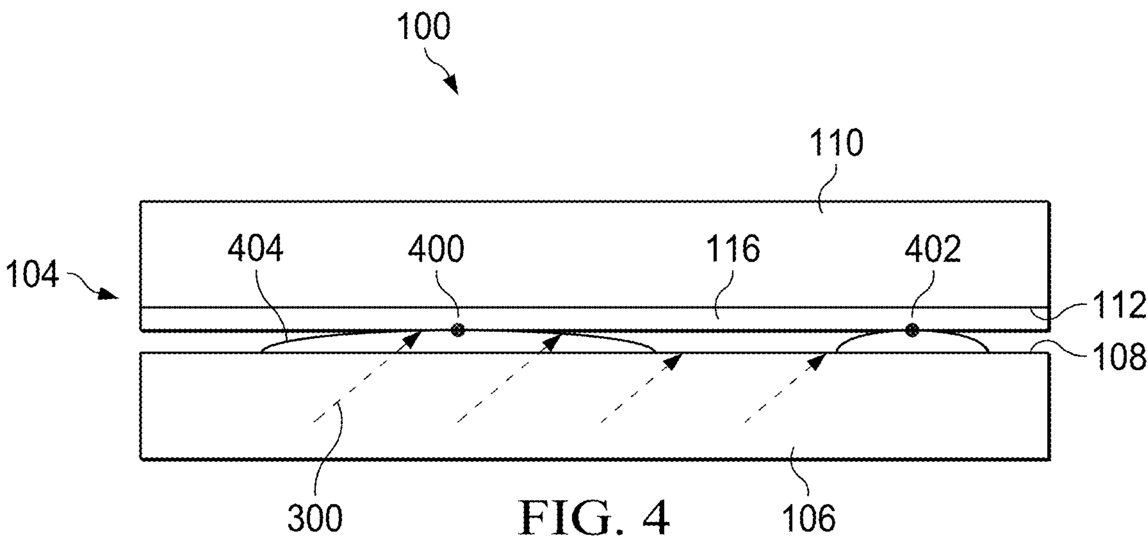
FIG. 4 illustrates an example of light propagation within a waveguide workpiece implementing bonding in optical contact areas between transparent bodies in the presence of TIR in accordance with some embodiments.

FIG. 4 illustrates another example of optical component 100 implementing the process of TIR-assisted laser welding of optical components using the coupling prism of FIG. 1 and/or FIG. 3 to create a heated bond in optical contact areas 400, 402 of waveguide workpiece 104. In particular, optical contact areas 400, 402 are forming as the surface 108 of the transparent body 106 abuts with the surface 112 of the transparent body 110 of the waveguide workpiece 104. As described above, optical component 100 has the waveguide workpiece 104 coupled to a coupling prism and after bringing the transparent body 106 and the transparent body 110 into contact, at least a portion of the transparent body 106 and the transparent body 110 will make contact, establishing an optical connection at one or more optical contact areas. The welding laser light 300 may breach the TIR condition, entering the transparent body 106 and interacting with the IR absorbing material 116 such as, a thin film coating.

The thin film coating, whether optical and/or absorptive, absorbs the welding laser light 300 and results in localized heating of the polymer 404 around the optical contact areas 400, 402 causing the polymer to soften or melt. The transparent body 106, which is devoid of an IR light absorbing material 116, may be preheated to a temperature close to its melting point before being brought into contact with the transparent body 110. In this scenario, the laser power may be adjusted to a level that is sufficient to melt the polymer around the optical contact areas 400, 402, for example, of the transparent body 106, but not enough to affect the cooler second transparent body 110. Further, the heat generated at the optical contact areas 400, 402, for example, may infiltrate the transparent body 110, causing a localized softening or melting of the polymer in the surrounding area. This potential deformation of the coated surface may lead to a decline in optical performance. However, this scenario may be avoided due to the initial contact at the optical contact areas 400, 402, where the thin film layer including IR light absorbing material 116 is flanked by solid polymer on both sides, making deformation unfeasible. With applied pressure, such as mechanical and/or hydrostatic pressure to bring the transparent body 106 and the transparent body 110 closer, the softened polymer expands laterally, enlarging the contact area. This process displaces any trapped air, ensuring the absence of air bubbles. Laser absorption and subsequent polymer heating occur exclusively within the optical contact area. Eventually, this contact area fills the entire gap between the transparent body 106 and the transparent body 110 to weld them together. In an embodiment, the laser may be deactivated when the entire area is bonded to prevent unintended softening of a larger polymer area.

During the welding process, a pressure feedback loop may be implemented to regulate the parallelism and evenness of the bonded waveguide. As the optical coating undergoes heating in this bonding procedure, there may be alterations to its optical characteristics, such as refractive index. This parallels the annealing step in coating fabrication. Hence, the design of the coating may aim for the desired performance based on the refractive index after this annealing process. Compared to conventional laser welding, this method restricts polymer heating to a localized area around the optical contact areas 400, 402. As a result, the properties of the polymer, including its surface integrity, may remain unaffected. The temperature of heating may be managed to maintain the temperature within the range of $T_{heating}>T_g$ (above the glass transition temperature) and $T_{heating}<T_{degra}$ (below the degradation temperature) of the core polymer, where $T_g$ represents the glass transition temperature, and $T_{degra}$ represents the degradation temperature.

Figure 5:
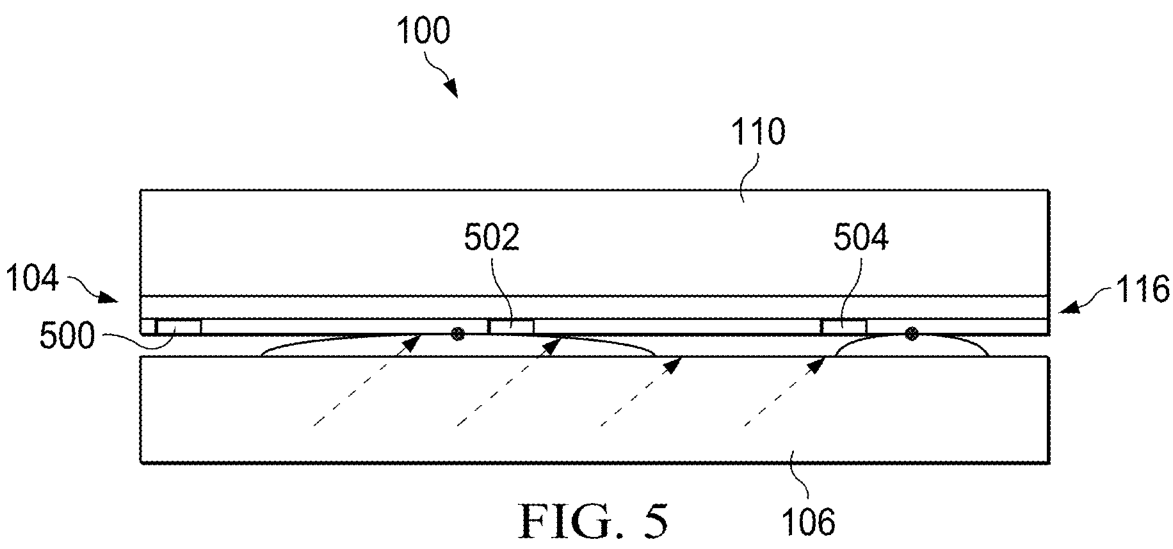
FIG. 5 illustrates an expanded view of an interface for TIR-assisted laser bonding of two transparent bodies of a waveguide workpiece having sacrificial protrusions in accordance with some embodiments.

FIG. 5 illustrates another example of the optical component 100 implementing the process of TIR-assisted laser welding of optical components using the waveguide workpiece 104 having a thin film layer such as, IR light absorbing material 116 with a plurality of openings 500, 502, 504. In an embodiment, of the IR absorbing material 116 having a plurality of openings 500, 502, 504 to create a gap, a pore, or an area where the IR light absorbing material 116 is devoid. In an embodiment the plurality of openings 500, 502, 504 may include any opening such as, micropores and/or nanopores. In an embodiment the micropores may have a size including, but not limited to, about 3 micrometers (μm) to about 50 μm. The plurality of openings 500, 502, 504 may traverse at least a portion of the softened polymer so the underlying polymer area does not receive direct light and/or enough thermal energy to melt. As a result, this region maintains its solid state during the brief operation of the welding laser, providing the necessary support for the thin film layer.

The plurality of openings 500, 502, 504 in the IR absorbing material 116 absorb the laser wavelength to prevent the deformation of the surface with the thin film. As the contact area expands, the pressure on the thin film layer from either side balances out, and may reduce a force that may deform it. Nevertheless, to further safeguard against surface deformation in the area with the thin film, the plurality of openings 500, 502, 504 may be located within the IR absorbing material 116 to absorb the laser wavelength. In other words, these opening 500, 502, 504 may absorb the laser wavelength, which means they absorb the energy from the laser beam. Further, the openings 500, 502, 504 of the IR absorbing material 116 absorbs at least a portion of the heat energy from the light of the light source. By doing so, they prevent this energy from directly affecting the polymer underneath them. This ensures that the area of the polymer under the gaps remains solid and provides support for the thin film layer during the laser welding process.

Figure 6:
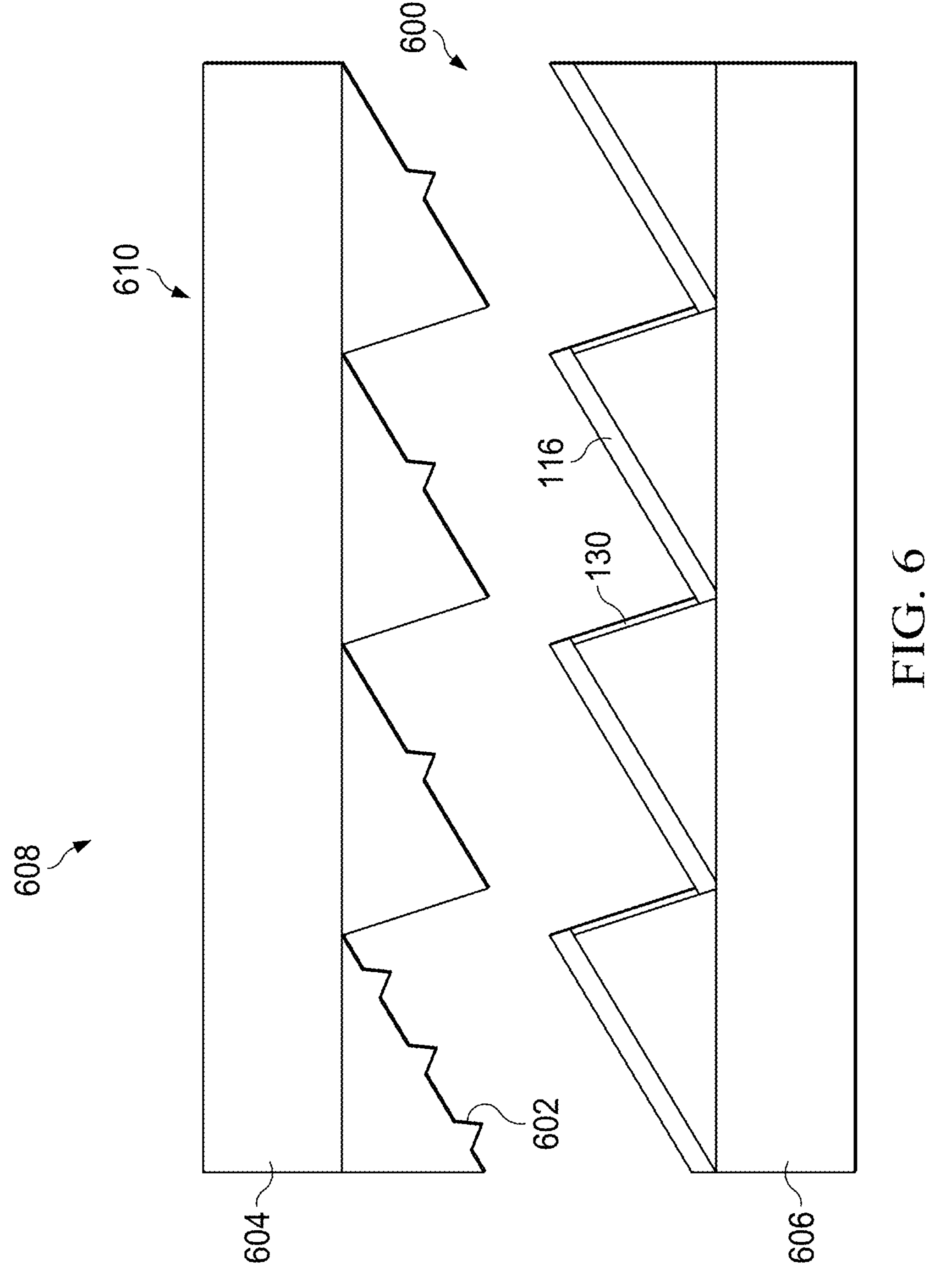
FIG. 6 illustrates an example of light propagation within a waveguide implementing the absorption of heat energy from a plurality of micropores in the IR absorbing material at an angle of TIR in accordance with some embodiments.

FIG. 6 shows another embodiment of an optical component 610 implementing TIR-assisted laser bonding having interface 600 between two transparent bodies 604, 606 of a waveguide workpiece 608 with sacrificial protrusions 602. In an example, the transparent body 604 is of a polymer material and is uncoated. The transparent body 604 may have sacrificial protrusions 602 facilitating initial optical contact between the transparent body 604 and the transparent body 606. The transparent body 606 may have an IR light absorbing material 116 and layer of immersion substance 130. Rather than relying on the natural roughness of the waveguide workpiece 608 for initial optical contact, the structure of the transparent body 604 may incorporate sacrificial protrusions 602. Sacrificial protrusions 602 may supplying the polymer material to bond the transparent body 604 and the transparent body 606 together. The sacrificial protrusions 602 may be placed on surfaces slated for welding, their dimensions, contours, and/or their distribution may be adjusted to match the surface configuration. In an embodiment, a plurality of the sacrificial protrusions 602 may be added to any uncoated surface of the waveguide workpiece 608. Light may be introduced from either the transparent body 604 or transparent body 606, with or without the presence of the sacrificial protrusions 602. In an embodiment, the laser is introduced into the uncoated polymer body located opposite to the polymer body with one or more light-absorptive coatings.

Figure 7:
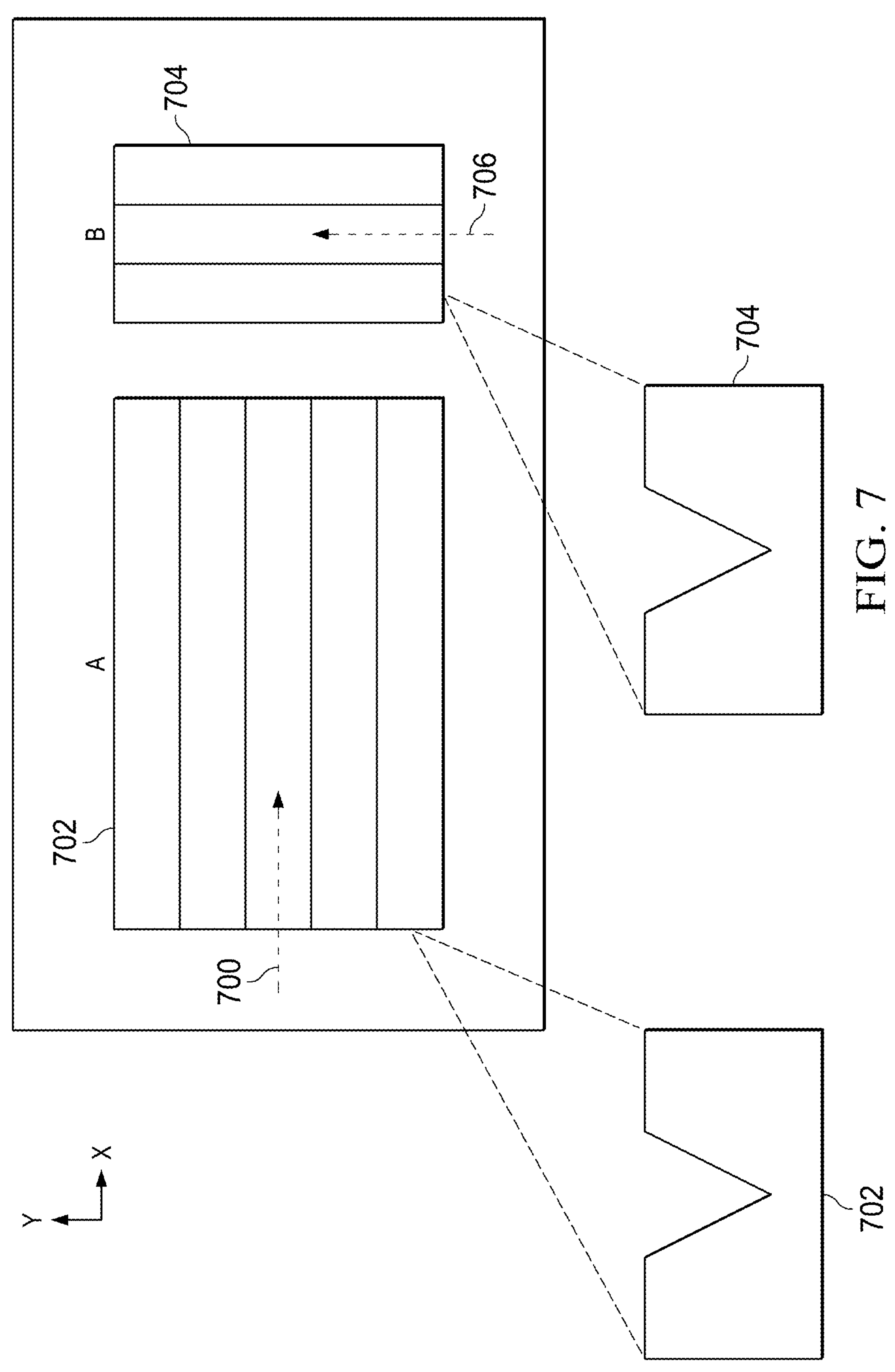
FIG. 7 illustrates an example of laser illuminators positioned at different azimuthal angles along a prism axis in accordance with some embodiments.

FIG. 7 illustrates an embodiment of two prism arrays 702, 704 of differing orientations implementing the process of TIR-assisted laser welding of optical components. In an example, laser illuminators 700 and 706, for example, are positioned at different azimuthal angles along a prism axis of prism arrays 702, 704. Achieving uniform illumination across the prism arrays 702, 704 using light from the welding laser in TIR condition may pose a challenge. Here, two prism arrays 702, 704 may be positioned at different orientations, with a substantially planar or flat area between them. Each region may need illumination at a polar angle sufficiently greater than a sin (1/n), where 'n' represents the refractive index of the polymer, to maintain TIR. For the substantially planar area, the azimuthal angle or the angle of the ray's projection on the waveguide surface relative to the X-axis, may be any value, as alterations in azimuthal angle do not impact the angle between the incident ray and the surface in the flat area. However, this is not the case for the prism arrays 702, 704. In areas of prism arrays 702, 704, the azimuthal angle of illumination may be selected in a manner that ensures the laser light propagates along the prism axis for light to undergo TIR at both surfaces of the prism. In an embodiment, due to the differing orientations of prism arrays 702, 704, it may not be feasible to illuminate the prism arrays 702, 704 with a single laser beam while upholding the TIR condition across the entire area.

Figure 8:
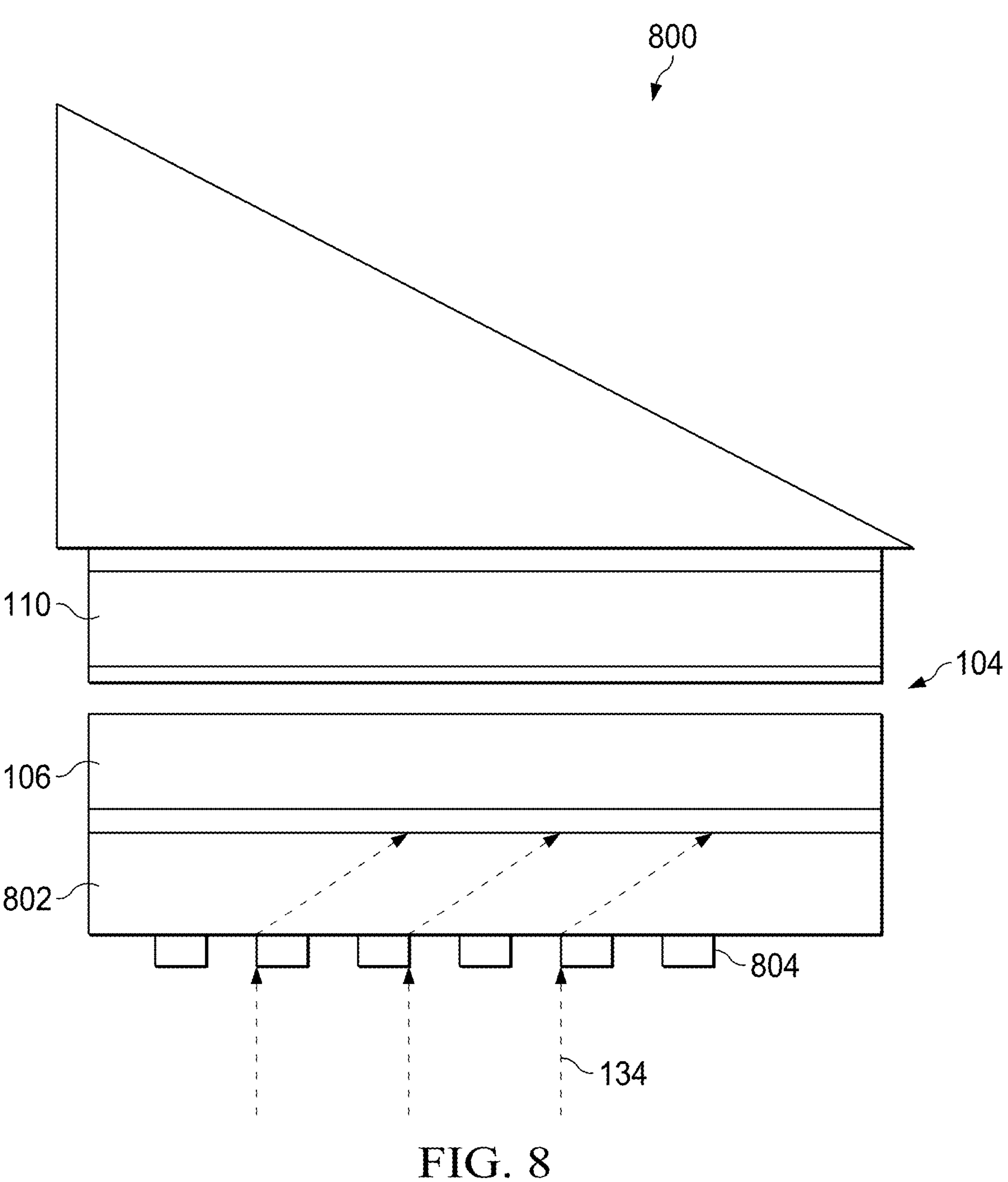
FIG. 8 illustrates an example of light propagation within a waveguide implementing a diffraction grating to diffract light into an angle of TIR in accordance with some embodiments.

FIG. 8 illustrates another example of optical component 800 implementing the process of TIR-assisted laser welding of optical components to achieve illumination from prism arrays 702, 704 from FIG. 7 using the waveguide workpiece 104 having a coupling plate 802 with a diffraction grating 804. The propagation of welding laser light 134 within waveguide workpiece 104 implementing a coupling plate 802 having a diffraction grating 804 to diffract welding laser light 134 into an angle of TIR. The azimuthal angle of illumination may be positioned in different areas of the waveguide workpiece 104 having transparent body 106 and transparent body 110. Here, the coupling prism is replaced by a flat or substantially planar coupling plate 802 with diffraction grating 804.

The coupling plate 802 may be made of a material including, but not limited to, glass. The diffraction grating 804 is designed in such a way as to diffract a substantial portion of incoming welding laser light 134 into the TIR angle. Changing the period of diffraction grating 804 may change the polar angle of the laser illumination after diffraction. The period of diffraction grating 804 refers to the spacing between its grating lines and/or grooves. By altering this spacing, a change occurs as the incoming welding laser light 134 interacts with diffraction grating 804, which, in turn, affects the angle at which the diffracted light is dispersed. Changing the grating orientation may change the azimuthal angle. For example, changing the grating orientation may include altering the angle at which the diffraction grating is positioned. The orientation of a grating refers to its angular alignment with respect to the incident light. By adjusting this orientation, the azimuthal angle may be changed, which is the angle measured around a circular path in a horizontal plane. This adjustment allows for control over the direction in which the diffracted light is dispersed. Therefore, varying the grating orientation across coupling plate 802 may facilitate the illumination azimuthal angle in both prism arrays 702 and 704 are correct. In the flat area between prism arrays 702, 704 from FIG. 7, any azimuthal angle may be acceptable.

Figure 9:
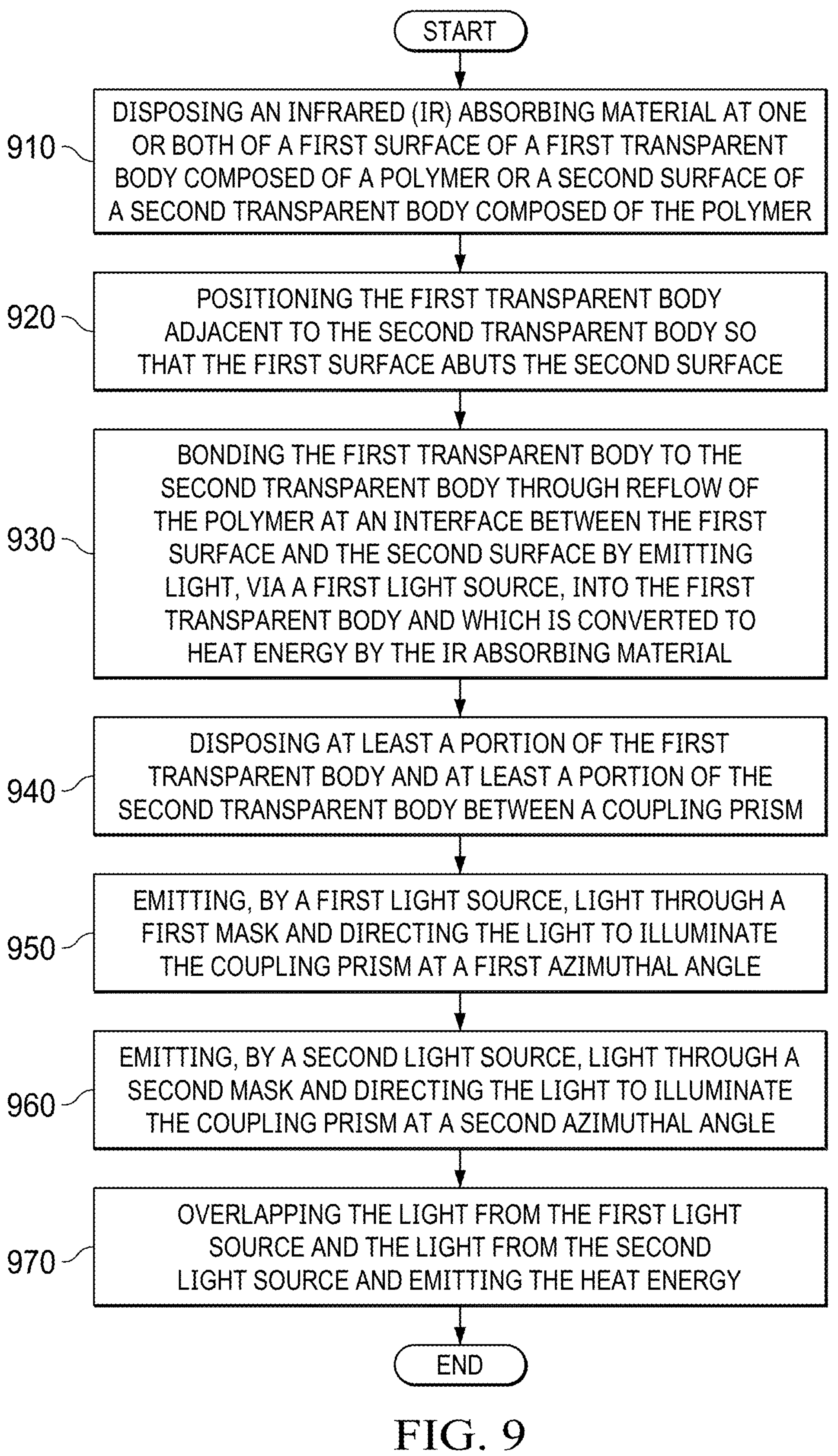
FIG. 9 is a flowchart illustrating a method of illuminating a prism in two areas using laser illuminators arranged at different azimuthal angles in accordance with some embodiments.

FIG. 9 describes a method of illuminating the prism of FIG. 7 without the use of a diffraction grating. In some embodiments, at 910, the method may include disposing an infrared (IR) absorbing material at one or both of a first surface of a first transparent body composed of a polymer or a second surface of a second transparent body composed of the polymer. At 920, the method may include positioning the first transparent body adjacent to the second transparent body so that the first surface abuts the second surface.

In some embodiments, at 930, the method may include bonding the first transparent body to the second transparent body through reflow of the polymer at an interface between the first surface and the second surface by emitting light, via a first light source, into the first transparent body and which may be converted to heat energy by the IR absorbing material. At 940, the method may include disposing at least a portion of the first transparent body and at least a portion of the second transparent body between a coupling prism.

In some embodiments, at 950, the method may include emitting, by a first light source, light through a first mask and directing the light to illuminate the coupling prism at a first azimuthal angle. At 960, the method may include emitting, by a second light source, light through a second mask and directing the light to illuminate the coupling prism at a second azimuthal angle. At 970, the method may include overlapping the light from the first light source and the light from the second light source and emitting the heat energy.

Achieving a desired illumination, without resorting to a diffraction grating, may include employing two laser illuminators positioned at distinct azimuthal angles. The beams from each illuminator are restricted by a mask, ensuring that each prism array is exclusively illuminated by the appropriate illuminator at the precise angle. In the flat region of the part, the beams may overlap. To achieve this masking of the beam, the mask may be integrated into the laser projection system, projecting its image onto the surface of the sample. Given that the illumination occurs at a substantial polar angle, a Scheimpflug adapter could be integrated into the illumination system to attain sharp focus across the entire image of the mask on the sample's surface.

Further, illumination may be achieved by using two laser illuminators positioned at different azimuthal angles. These illuminators emit beams of light that are controlled by masks, ensuring that each prism array is illuminated by the appropriate illuminator at the correct angle. Each illuminator is responsible for illuminating specific areas based on the angle needed. Using two laser illuminators at different azimuthal angles may include a planar (horizontal) arrangement rather than a polar (vertical) one. Two laser illuminators are positioned at different azimuthal angles. They are set up in a way that they emit laser beams in different horizontal directions. The emitted beams from each illuminator are then masked. A physical barrier, referred to as a mask, is placed in front of each beam emitted from the light source. This mask is designed in such a way that it allows only at least a portion of the beam to pass through to shapes and/or filter the beam. With the mask in place, each prism array is illuminated by one of the laser illuminators at a correct angle to ensure that each prism array receives light from the appropriate direction. In the flat area of the part, where there are no prism arrays, the beams from both illuminators may overlap so that the beams combine to illuminate this region.

In an embodiment, the masking of the beam may be achieved by incorporating the mask as a component of the laser projection system. The mask may be positioned within the system to interact with the laser beams before they reach the sample's surface. Since the beams are projected at an angle, a Scheimpflug adapter (not shown) may be employed. This is an optical device that helps achieve sharp focus over at least a portion of the image of the mask on the surface of the sample. It may be used when projecting at non-perpendicular angles to allow for control over the illumination angles and patterns, in achieving imaging and/or measurement objectives.

The illumination system may include a Scheimpflug adapter. The illumination in this system may be operated at a significant polar angle. This means that the light beams are projected onto the sample's surface at an angle that is not perpendicular. A Scheimpflug adapter is an optical device used in imaging systems. It allows for the adjustment of the plane of focus in non-perpendicular imaging situations, such as when projecting light at an angle. In this system, a Scheimpflug adapter may be incorporated into the illumination system to ensure that the image of the mask remains in sharp focus across the surface of the sample, even though the illumination is at an angle. Further, a Scheimpflug adapter allows for the adjustment of the tilt of the imaging plane. This means that it aligns the focal plane of the camera or imaging system with the tilted plane of the sample surface. In doing so, the entire image of the mask, which is projected onto the sample surface, remains sharply focused, despite the non-perpendicular projection angle. The incorporation of a Scheimpflug adapter compensates for the non-perpendicular illumination angle so that the image of the mask is sharply focused across the surface of the sample to maintain accurate and high-quality imaging results in scenarios where illumination occurs at significant angles.

In some embodiments, the light may be IR light provided by an IR light source mounted proximate to the first transparent body. In some embodiments, the IR absorbing material has one or more micropores having a size of about 3 micrometers (μm) to about 50 μm. In some embodiments, the method may include one or more openings such as micropores and/or voids in the IR material. These micropores are not configured to absorb the laser light and are not heated up. Instead, they remain relatively cool compared to the surrounding areas and create what may be described as "cold points" within the structure. While the surrounding areas are being heated and melted by the laser, the cold points act as stabilizing points, helping to maintain the overall structure of the waveguide. During laser welding, the micropores remain relatively unaffected by the heat, allowing them to serve as anchor points that prevent the waveguide from warping or distorting under the intense heat generated by the laser. This may maintain the integrity and precision of the waveguide's structure during the welding process.

In some embodiments, the method may include disposing of a thin film layer over the IR absorbing material. In some embodiments, the thin film layer may be an anti-reflective material. In some embodiments, the method may include, responsive to positioning, disposing at least a portion of the first transparent body and at least a portion of the second transparent body between a coupling prism. In some embodiments, a first light source may have a first mask directing the emitted light to illuminate the coupling prism at a first azimuthal angle.

In some embodiments, a second light source may have a second mask directing the emitted light to illuminate the coupling prism at a second azimuthal angle. The emitted light from the first light source and the second light source may overlap to emit the heat energy. In some embodiments, the method may include coupling the light of the first light source into at least a portion of one of the bonded first transparent body or the second transparent body at a TIR angle.

In some embodiments, responsive to the first surface abutting the second surface forming an interface, the emitted light may be distributed across the interface via TIR within the first transparent body. In some embodiments, the method may include initiating optical contact using one or more sacrificial protrusions connected to a transparent body devoid of IR absorbing material.

In some embodiments, certain aspects of the techniques described above may be implemented by one or more processors of a processing system executing software. The software comprises one or more sets of executable instructions stored or otherwise tangibly embodied on a non-transitory computer readable storage medium. The software may include the instructions and certain data that, when executed by the one or more processors, manipulate the one or more processors to perform one or more aspects of the techniques described above. The non-transitory computer readable storage medium may include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media may include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes may be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

disposing an infrared (IR) absorbing material at one or both of a first surface of a first transparent body composed of a polymer or a second surface of a second transparent body composed of the polymer;

positioning the first transparent body adjacent to the second transparent body so that the first surface abuts the second surface;

bonding the first transparent body to the second transparent body through reflow of the polymer at an interface between the first surface and the second surface by emitting light, via a first light source, into the first transparent body and which is converted to heat energy by the IR absorbing material; and coupling the light of the first light source into at least a portion of one of the bonded first transparent body or the second transparent body at a total internal reflection (TIR) angle.

2. The method of claim 1, wherein the light is IR light provided by an IR light source mounted proximate to the first transparent body.

3. The method of claim 1, wherein the IR absorbing material having one or more micropores having a size of about 3 micrometers (μm) to about 50 μm.

4. The method of claim 1, further comprising:

stabilizing, by one or more openings of the IR absorbing material, the first transparent body and the second transparent body when the one or more openings forms a barrier from the heat energy generated from the light of the first light source.

5. The method of claim 1, further comprising:

disposing a thin film layer over the IR absorbing material.

6. The method of claim 5, wherein the thin film layer is a multilayer dielectric coating.

7. The method of claim 1, further comprising:

disposing at least a portion of the first transparent body and at least a portion of the second transparent body between a coupling prism.

8. The method of claim 7, further comprising:

emitting, by a first light source, light through a first mask and directing the light to illuminate the coupling prism at a first azimuthal angle.

9. The method of claim 8, further comprising:

emitting, by a second light source, light through a second mask and directing the light to illuminate the coupling prism at a second azimuthal angle.

10. The method of claim 9, further comprising:

overlapping the light from the first light source and the light from the second light source and emitting the heat energy.

11. The method of claim 1, further comprising:

distributing the light across the interface via total internal reflection (TIR) within the first transparent body when the first surface abuts the second surface forming an interface.

12. The method of claim 1, further comprising:

diffracting at least a portion of the emitted light into a total internal reflection (TIR) angle when the emitted light is directed to a diffraction grating at a second surface of the first transparent body.

13. The method of claim 12, further comprising:
changing a polar angle of the light emitted by the first light source when spacing and orientation of one or more grating lines of the diffraction grating is increased or decreased.

14. The method of claim 12, further comprising:
changing an angle at which the diffraction grating is positioned to change an azimuthal angle for control over a direction in which the diffracted light is dispersed.

15. The method of claim 12, further comprising:
aligning a focal plane of the light with a tilted plane of a coupling prism, using a Scheimpflug adapter, when the emitted light is projected at the coupling prism at a polar angle.

16. The method of claim 1, further comprising:
initiating optical contact using one or more sacrificial protrusions connected to a transparent body devoid of IR absorbing material.

17. A waveguide fabricated using the method of claim 1.

* * * * *